United States Patent [19]

Gessner et al.

[11] 4,351,631
[45] Sep. 28, 1982

[54] TRANSFER DEVICE FOR PARISONS AND FINISHED PRODUCTS IN INJECTION BLOW MOLDING DEVICES

[75] Inventors: Dieter Gessner, Karben; Lothar Ott, Schwalbach, both of Fed. Rep. of Germany

[73] Assignee: tpT Machinery Corporation, Norwalk, Conn.

[21] Appl. No.: 163,196

[22] Filed: Jun. 26, 1980

[30] Foreign Application Priority Data

Jul. 9, 1979 [DE] Fed. Rep. of Germany ....... 2927642

[51] Int. Cl.³ .............................................. B29C 17/07
[52] U.S. Cl. ................................... 425/533; 425/534; 425/535; 294/86.3; 294/99 R
[58] Field of Search ............... 425/533, 534, 535, 457; 294/86.32, 86.3, 86.33, 99 R

[56] References Cited

U.S. PATENT DOCUMENTS

| 2,829,918 | 4/1958 | Stoakes et al. | 294/99 R |
| 3,632,264 | 1/1972 | Butcher | 425/387.1 X |
| 3,685,943 | 8/1972 | Fischer | 425/534 X |
| 3,726,557 | 4/1973 | Ventre | 294/99 R X |
| 3,981,673 | 9/1976 | Sokolow | 425/534 X |
| 4,197,073 | 4/1980 | Rees et al. | 425/533 X |

FOREIGN PATENT DOCUMENTS

1060249 3/1967 United Kingdom ................ 425/535

*Primary Examiner*—Jan H. Silbaugh
*Attorney, Agent, or Firm*—Bachman and LaPointe

[57] ABSTRACT

A transfer device for open neck plastic parisons and finished articles in injection blow molding equipment. The device includes a core or pin which is attached to a plate and can be inserted into the parison or finished article. A collet is included which is supported by the core, an extension of the core, or the plate in such a way that the collet grips the neck of the parison or finished article when in one position, and releases it when in a second position.

18 Claims, 2 Drawing Figures

4,351,631

TRANSFER DEVICE FOR PARISONS AND FINISHED PRODUCTS IN INJECTION BLOW MOLDING DEVICES

BACKGROUND OF THE INVENTION

Methods and procedures are already known, or have been proposed, for the manufacture of organic plastic parisons and finished articles via injection molding, whereby the parisons and finished articles exhibit biaxial orientation, produced, for example, by stretching and blowing the parisons.

It is also known that the process requires transference of the parison from the injection core to a tempering mold, from the tempering mold to a stretch/blow mold, and from this to a position where the finished plastic hollow body, i.e., the stretched and blown parison, may be ejected. Of course, not all of these transfer operations may be necessary. Where they are required however, the present invention represents an improvement in conventional procedure.

For a better understanding of the present invention, it should be noted that the neck of the article under production, also referred to synonymously as the "edge" or "finish", is of great importance in carrying out any of the above-mentioned transfer operations with the desired accuracy. It must maintain its shape without distortion during each operation, and in particular, it always should remain concentric with the body of the parison.

The aim of the present invention is to protect the neck, and to prevent any distortion from occurring during the operations of transferring the parison from the mold in which it is first produced, for example by pressure molding, and accurately inserting it in any subsequent mold during the production sequence.

A further aim of the invention is to provide a seal sufficiently strong to permit application of relatively high internal pressure to the parison during the blowing stage, without the neck losing its shape.

SUMMARY OF THE INVENTION

In accordance with the present invention the objects and advantages of the present invention are readily obtained. The transfer device of the present invention for open neck plastic parisons and finished articles in injection blow molding equipment comprises: a core or pin which is attached to a plate and is operative for insertion into said parison or finished article, said device including a collet movable between a first position and a second position supported by an element selected from the group consisting of said core, an extension of the core, and the plate, so that said collet grips the neck when in one of said positions, and releases it when in a second of said positions. Preferably, the collet slides between its supports from said first to said second position.

BRIEF DESCRIPTION OF THE DRAWINGS

An example of implementation of the present invention is given in the attached drawings wherein.

DETAILED DESCRIPTION

Figure 1:
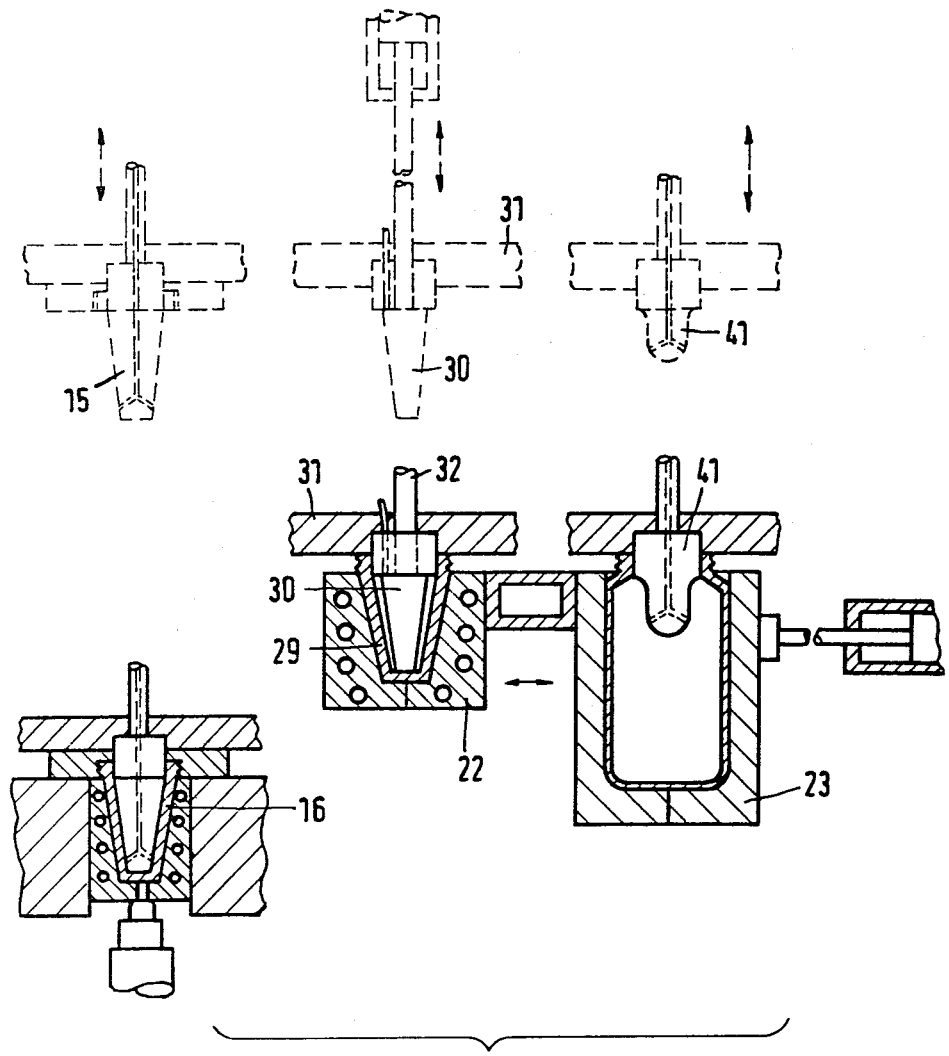
FIG. 1 shows a frontal view of a representative device for the production of plastic hollow bodies, illustrating the present invention.

FIG. 1 shows a parison 16, which has been transferred to a tempering mold 22 (the first mold), by means of an injection core 15. In the next step, a stretch/blow core 30 (the second core) is inserted into the parison. The parison then is transferred to a finishing mold 23 (the second mold) by means of the second core. The finished article finally is transferred from the second mold 23 to the ejector position by means of an injector plug 41. The details of the foregoing are not necessary to an understanding of the present invention and are described in more detail in U.S. Pat. No. 4,174,934, the disclosure of which is incorporated herein by reference.

Figure 2:
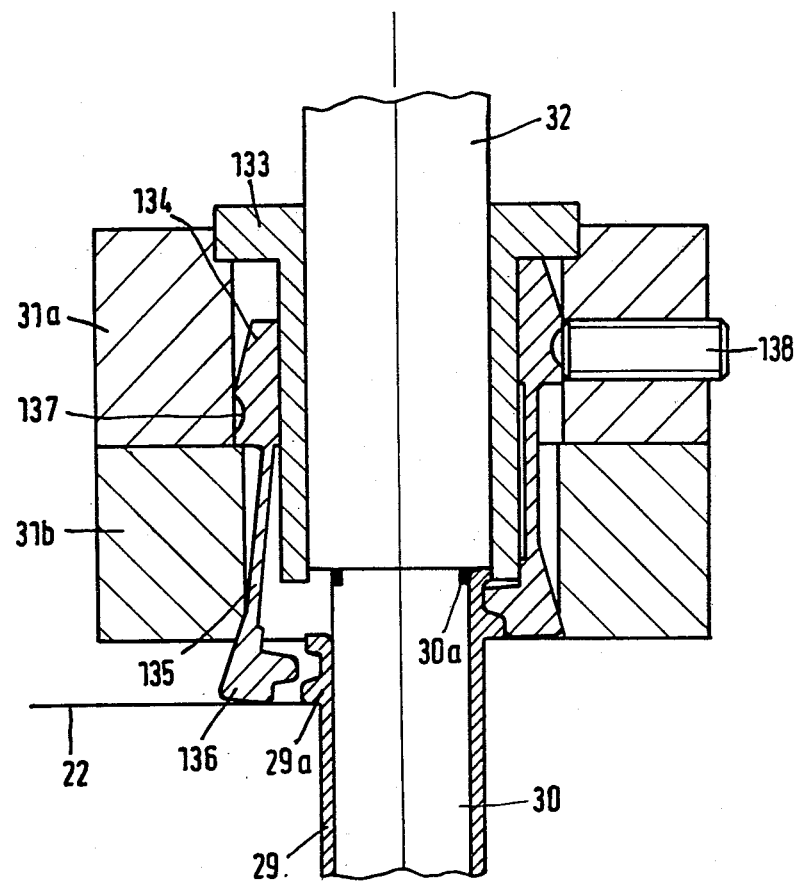
FIG. 2 shows a cross-section of part of a device in accordance with the present invention wherein the left side of the diagram shows the components in the open position, while the right side shows them in the closed position.

FIG. 2 illustrates those components of the device of the present invention which are specifically relevant to the present invention. On the left, the components are shown in the open position, on the right, in the closed position. The parison 29 is inserted into the tempering mold 22 (FIG. 2). The parison neck 29a is fully formed by injection molding in the corresponding neck mold, with no further operations being required thereon when the parison neck is removed from the neck mold.

Because the parison neck 29a is usually relatively large and bulky, it is slow to cool to a temperature at which it can resist external pressure without distortion. The blow core 30, shown in FIG. 1, is inserted into the parison 29 while the parison is in the tempering mold 22. After being subjected to temperature conditioning in the mold 22, the parison 29 is removed from mold 22 by means of the core 30. It is clear that appreciable force must be exerted when inserting the core 30 into the parison neck 29a, if it is to fit sufficiently tightly. In order to resist this pressure without distortion, the neck 29a must be allowed to cool to the requisite temperature prior to insertion of the core 30. Since a relatively lengthy cooling-off period would be required, the operating cycle would be considerably extended. However, the device in accordance with the present invention makes possible an alternative and advantageous procedure, whereby the insertion of the core 30, and the transfer of the parison from the mold 22 to the next operating position may be carried out without delay and without making allowance for the mechanical resistance of the parison neck 29a.

The device shown in FIG. 2 consists of 2 plates, 31a and 31b, corresponding to plate 31 (FIG. 1), to which a flanged sleeve 133 is attached. The flanged sleeve 133 encloses an extension piece 32 of the core 30 which can be considered part of said core. A collet 134 is inserted in the narrow space between the plates 31a and 31b, and the flanged sleeve 133, in such a way that it is supported by the core, or the core extension or the plates and is capable of reciprocating motion within this space. Collet 134 carries quills 135 which extend axially and are arranged in a cylindrical or circular pattern on the collet 134. The quills 135 have enlarged heads 136 which form an inner contour capable of gripping or enclosing the parison neck 29a. The quills 135 are elastic or flexible so that when pressed inward they form a closed surface. If no pressure is applied to the quills, however, they remain spaced equidistantly from one another, the spaces tangentially directed. The dimensions of the upper part of the collet 134 in particular, are such that it can slide snugly between the plate 31a and the sleeve 133. Collet 134 also has at least one indentation or recess 137, which may be engaged by means of a corresponding pin 138.

During operation of the device in accordance with the invention, the core 30 is inserted into the parison 29, and the entire assembly is lowered until it firmly engages with the upper rim of the mold 22, as illustrated in FIG. 2 on the right where the components are shown in the closed position. The core 30 has seal 30a, which performs the function of sealing the core 30 during the subsequent blowing operation.

When the assembly is positioned in this way, the plate 31b presses the quills 135 inward in a radial direction so that the heads 136 lock with the neck 29a and prevent deformation thereof during insertion of core 30 into parison 29. At the same time, the flange of the flanged sleeve 133 rests on the upper surface of the collet 134. In this position, pressure is exerted, not on the parison neck 29a, but only on the upper surface of the mold 22, thus preventing damage to, or distortion of, the neck. When the components are in this position, the pin 138 engages with the identation 137 on the collet 134. Sufficient force, enough to hold the pin in position, but not enough to cause it to be displaced, is exerted on the pin by a quill, spring or something similar (not shown). In order to disengage the core 30 from the parison 29, the assembly described above is raised to the open position, as illustrated in FIG. 2 on the left, whereby the plate 31b is detached from the mold 22, i.e. leaves the surface of contact. This is done by applying sufficient force to disengage the pin 138 from the identation 137, causing the collet 134 to be displaced downwards in the space between plates 31a and 31b and the sleeve 133. When the collet is thus displaced, pressure is no longer exerted on the quills 135, which then spring open and release the neck 29a of the parison.

While the operation has been illustrated here in connection with the tempering mold, it should be noted that the same procedure may be employed when transferring the parison to, and removing it from, the finishing mold 23, by means of an ejector plug 41.

It should also be noted that the collet 134 and especially the quills 135 thereof must be made of a flexible material that can be bent repeatedly without breaking. Suitable materials include, for example, spring steel, alloys of beryllium and/or copper, and synthetics, particularly polyamide.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. Transfer device for open neck articles in injection blow molding equipment to protect the neck from distortion comprising a pin-like means which is attached to a plate and is operative for insertion into the article, said device including an elongated collet having means at one end contacting said neck and said equipment, means associated with said pin-like means for transmitting pressure through said collet to said equipment when said pin-like means contacts said neck, wherein said collet is movable between a first position and a second position and supported between said pin-like means and plate so that said collet grips said neck and prevents distortion thereof when in said first position and releases it when in said second position, whereby pressure from said pin-like means and plate is transmitted away from said neck through said collet.

2. A transfer device according to claim 1 wherein the collet is supported in such a way that it is capable of sliding movement.

3. A transfer device according to claim 2 wherein the collet is positioned and supported between the plate and an extension of said pin-like means.

4. A transfer device according to claim 1 wherein the collet is cylindrical in shape and bears quills which can be bent in a radial direction.

5. A transfer device according to claim 4 wherein the quills are arranged at a tangential distance from one another.

6. A transfer device according to claim 5 wherein the quills have exposed ends and have enlarged heads at their exposed ends, which form a closed ring when in the first gripping inner position, and are spaced tangentially to one another when in the second releasing outer position.

7. A transfer device according to claim 6 wherein the quills exhibit inner contours corresponding to said neck.

8. A transfer device according to claim 7 wherein said heads are arranged in such a way as to be capable of radial movement when the collet is moved axially in relation to the pin-like means or the plate.

9. A transfer device according to claim 1 wherein the collet is capable of movement within a space formed by the pin-like means and the plate.

10. A transfer device according to claim 6 wherein the quills are prestressed in a radial outward direction, and the movement of the heads in the second releasing outer position is delimited by the plate.

11. A transfer device according to claim 1 wherein the collet has at least one identation, and components are provided on said plate that engage with said indentations and thereby fix the axial position of the collet.

12. A transfer device according to claim 4 wherein the entire collet or the quills are made of a flexible material selected from the group consisting of spring steel, alloys of beryllium, alloys of copper, and a polyamide.

13. A transfer device according to claim 1 including a seal mounted on the pin-like means.

14. A transfer device according to claim 1 wherein said articles are plastic parisons.

15. A transfer device according to claim 1 wherein said articles are finished articles.

16. A transfer device according to claim 1 including a mold engageable with said collet, wherein pressure from said pin-like means is transmitted away from said neck through said collet to said mold.

17. A transfer device according to claim 1 wherein the collet is capable of movement within a space formed by an extension of the pin-like means and the plate.

18. A transfer device according to claim 1 including a seal mounted on an extension of the pin-like means.

* * * * *

UNITED STATES PATENT AND TRADEMARK OFFICE
CERTIFICATE OF CORRECTION

PATENT NO. : 4,351,631
DATED     : September 28, 1982
INVENTOR(S) : Dieter Gessner and Lothar Ott It is certified that error appears in the above-identified patent and that said Letters Patent are hereby corrected as shown below:

Column 3, line 21, change "identation" to ---indentation---.

Column 3, line 30, change "identation" to ---indentation---.

Column 4, line 41, claim 11, change "identation" to ---indentation---.

Signed and Sealed this

Twelfth Day of April 1983

[SEAL]

Attest:

GERALD J. MOSSINGHOFF

Attesting Officer    Commissioner of Patents and Trademarks